(12) United States Patent
Sato

(10) Patent No.: US 6,578,544 B2
(45) Date of Patent: Jun. 17, 2003

(54) ELECTROMAGNETIC FUEL INJECTION VALVE

(75) Inventor: Kouji Sato, Saitama Prefecture (JP)

(73) Assignee: Bosch Automotive Systems Corporation (JP)

( * ) Notice: Subject to any disclaimer, the term of this patent is extended or adjusted under 35 U.S.C. 154(b) by 95 days.

(21) Appl. No.: 09/851,022

(22) Filed: May 8, 2001

(65) Prior Publication Data

US 2001/0052555 A1 Dec. 20, 2001

(51) Int. Cl.⁷ .............................................. F02M 51/00
(52) U.S. Cl. .................... 123/295; 123/305; 123/41.31; 239/533.12; 239/132
(58) Field of Search ............................. 123/41.31, 295, 123/305, 470, 472; 239/128, 132, 533.12, 543, 544, 545

(56) References Cited

U.S. PATENT DOCUMENTS

| | | | | |
|---|---|---|---|---|
| 3,093,310 A | * | 6/1963 | Wagner | 123/41.31 |
| 3,993,030 A | * | 11/1976 | Jaulmes | 123/470 |
| 4,813,610 A | * | 3/1989 | Renowden | 239/499 |
| 4,860,700 A | * | 8/1989 | Smith | 123/41.31 |
| 5,291,869 A | * | 3/1994 | Bennett | 123/527 |
| 5,540,200 A | * | 7/1996 | Naitoh et al. | 123/305 |
| 5,586,726 A | * | 12/1996 | Furuya et al. | 239/533.12 |
| 5,860,394 A | * | 1/1999 | Saito et al. | 123/41.31 |
| 6,065,691 A | * | 5/2000 | West | 239/407 |
| 6,334,434 B1 | * | 1/2002 | Imoehl et al. | 123/472 |

FOREIGN PATENT DOCUMENTS

| | | |
|---|---|---|
| JP | 56-94856 | 12/1954 |
| JP | 59-172276 | 11/1984 |
| JP | 62-31613 | 8/1987 |
| JP | 5-83366 | 11/1993 |
| JP | 8-144762 | 6/1996 |
| JP | 8-177499 | 7/1996 |
| JP | 9-264232 | 10/1997 |

* cited by examiner

Primary Examiner—Carl S. Miller
(74) Attorney, Agent, or Firm—Ostrolenk, Faber, Gerb & Soffen, LLP

(57) ABSTRACT

The present invention provides an electromagnetic fuel injection valve having a simple and efficient constitution for enabling the jets 23 themselves from injection orifices to cool and wash off the nozzle body 13, and to suppress or remove carbon deposits that is produced and adhere to the injection orifices. In an electromagnetic fuel injection valve, which injects a high-pressure fuel as a flat-shaped spray 21 (fan spray) by causing the jets 23 to impinge on one another after being injected from at least a pair of injection orifices, the constitution is such that, with the aim of causing jets 23 to impinge, by controlling the pressure and direction of the jets 23, so that the jets 23 also go to, in addition to a normal injection direction which goes toward the direction of the combustion chamber 4, also to the opposite direction (upstream side) which goes toward the direction of the bottom surface of the combustion chamber side of the nozzle body 13, the jets 23 resulting from fuel injected from injection orifices impinge on one another, and a flat-shaped spray 21 is diffused in the direction of the combustion chamber 4, and, in addition, also diffused in the direction of the nozzle body 13 on the upstream side thereof (upstream side diffusing portion 21C).

7 Claims, 3 Drawing Sheets

ELECTROMAGNETIC FUEL INJECTION VALVE

BACKGROUND OF THE INVENTION

1. Field of the Invention

The present invention relates to an electromagnetic fuel injection valve, and more particularly to an electromagnetic fuel injection valve for in-cylinder direct fuel injection in a system, which directly injects gasoline and other such fuels into a combustion chamber.

2. Description of the Related Art

As for the spray configuration in a conventional electromagnetic fuel injection valve for in-cylinder direct fuel injection, there is a cone shaped configuration that makes use of the swirling flow of a fuel, but this configuration is limited when it comes to enhancing fuel atomization and the state of an air/fuel mixture.

Another problem is that this configuration makes it difficult to suppress the formation of carbon deposits accompanying the combustion of a fuel.

An outline of the problem of suppressing the formation of carbon deposits will be given based on FIG. 7 and FIG. 8.

FIG. 7 is a simplified side view of the principal portion of the nozzle body 2 part of an ordinary electronic fuel injection valve 1, and fuel is injected toward a combustion chamber 4 as a cone-shaped spray 5 from an injection orifice 3 formed in the center tip portion of the nozzle body 2.

FIG. 8 is a bottom view, as seen from the combustion chamber 4 side, of the bottom surface 6 of the combustion chamber side of a nozzle body 2, and carbon deposits C are formed around the injection orifice 3 of the center portion thereof. As the condition under which carbon deposits C are formed, there is a fixed formation temperature range, and in order to either suppress or reduce carbon deposits C, there is the method of either applying heat in excess of the upper limit temperature of the temperature thereof, or cooling to below the lower limit temperature.

As a measure for suppressing carbon deposits C, when trying, for example, to lower the temperature of the nozzle body 2, the problem is that, for a cone-shaped spray 5, the only hope is a cooling action resulting from the flow of a fuel through the injection orifice 3 from inside the nozzle body 2, and the flow of a fuel at the injection orifice 3 part, but the actual cooling effect is not sufficient.

Over time, the carbon deposits C thereof accumulate around the injection orifice 3, and there are even cases in which carbon deposits C also penetrate into the upstream side inside the injection orifice 3, causing changes in the quantity of fuel injected, the shape of the spray, or the injection direction. In any event, this is not a desirable phenomenon for an electronic fuel injection valve 1, and either avoiding or suppressing the phenomenon thereof is an essential task.

As constitutions for reducing the temperature of the nozzle body 2, there are, for example, Japanese Utility Model Application Laid-open No. S56-94856, Japanese Utility Model Publication No. S62-31613, and Japanese Patent Laid-open No. H9-264232.

Further, a cone-shaped spray 5 is limited when it comes to enhancing fuel atomization and the state of an air/fuel mixture.

Accordingly, as in Japanese Utility Model Application Laid-open No. S59-172276, Japanese Utility Model Laid-open No. H5-83366, Japanese Patent Laid-open No. H8-144762, and Japanese Patent Laid-open No. H8-177499, for example, there are constitutions in which a high-pressure fuel is injected by either changing the spray shape, or as a flat-shaped spray (fan spray), by causing fuel jets to impinge on one another after being injected from at the least a pair of injection orifices.

In the case of the fan-spray fuel injection valves thereof as well, the problem is that it is necessary to provide separately a cooling structure for appropriately and adequately cooling the nozzle body 2 and the injection orifice 3 parts, and it is difficult to avoid the formation of carbon deposits C with a simple constitution.

SUMMARY OF THE INVENTION

With the foregoing problems in view, it is an object of the present invention to provide an electromagnetic fuel injection valve, which is capable of reducing emissions by promoting combustion via the atomization of injected fuel, and, in addition, is capable of reducing emissions by lowering fuel consumption by promoting the mixing of injected fuel with air.

Further, an object of the present invention is to provide an electromagnetic fuel injection valve capable of suppressing carbon deposits that form and adhere to the bottom surface of the combustion chamber side of a nozzle body and an injection orifice.

Further, an object of the present invention is to provide an electromagnetic fuel injection valve constituted such that formed carbon deposits are washed away by injected fuel.

Further, an object of the present invention is to provide an electromagnetic fuel injection valve capable of suppressing the formation of carbon deposits via a simple constitution.

Further, an object of the present invention is to provide an electromagnetic fuel injection valve comprising a constitution for simple and efficient carbon deposit suppression, such that a nozzle body can be cooled, and, in addition, washed off by a fuel jet itself, which is injected from an injection orifice.

In other words, the present invention is an electromagnetic fuel injection valve for injecting a high-pressure fuel as a flat-shaped spray (fan spray) by causing fuel jets to impinge upon one another after being injected from at the least a pair of injection orifices, and is one, which aims at causing jets to impinge by controlling the pressure and direction of the jets so that the jets also go toward the direction of the bottom surface of the combustion chamber side of the nozzle body in the direction opposite (upstream side) of a normal injection direction, which goes toward the direction of the combustion chamber, and is an electromagnetic fuel injection valve, having an electromagnetic coil; a nozzle body, which forms at the least a pair of injection orifices constituted such that each jet resulting from injected fuel impinges upon the other inside a combustion chamber; and a needle valve, which sits on the seat portion of this nozzle body, and, in addition, is capable of opening and closing the above-mentioned injection orifices by exciting the above-mentioned electromagnetic coil, and being constituted such that the above-mentioned jets resulting from fuel injected from the above-mentioned injection orifices are made to impinge upon one another, and are injected as a flat-shaped spray, this electromagnetic fuel injection valve being characterized in that the above-mentioned flat-shaped spray is diffused in the above-mentioned direction of the combustion chamber, and, in addition, in the direction of the above-mentioned nozzle body of the upstream side.

The above-mentioned spray, which diffuses in the above-mentioned nozzle body direction, can be constituted so as to wash off the proximity of the above-mentioned injection orifice.

The above-mentioned spray, which diffuses in the above-mentioned nozzle body direction, can have a cooling and washing area, which encloses the above-mentioned injection orifice on the combustion chamber-facing surface of the above-mentioned nozzle body.

It is possible to adjust the degree of diffusion toward the upstream side of the above-mentioned spray by selecting the degree of inclination of each of the above-mentioned injection orifices relative to the axis of the above-mentioned needle valve.

It is possible to adjust the degree of diffusion toward the upstream side of the above-mentioned spray by selecting the injection orifice pitch between the axis of each of the above-mentioned injection orifices.

In an electromagnetic fuel injection valve according to the present invention, because of being constituted such that a constituent for diffusing to the upstream side is generated from the flat-shaped spray formed by the jets impinging upon one another, and the upstream side diffusion constituent thereof is made to impinge on the bottom surface of the combustion chamber side of the nozzle body and wash off an injection orifice part, a cooling action, and, in addition, a washing action resulting from the injected fuel work together around an injection orifice, making it possible to suppress the generation and accumulation of carbon deposits around an injection orifice.

That is, because the area surrounding an injection orifice is cooled and washed by the injection pressure and temperature itself of the injected fuel itself, it is possible to make the most of an efficient carbon deposit generation suppressing function via a simple constitution and control, without the need to provide either a special cooling structure or washing structure.

Furthermore, it is possible to reduce emissions by promoting combustion via the atomization of injected fuel on the basis of the impinging of high-pressure jets, and, in addition, it is possible to reduce emissions by lowering fuel consumption by promoting the mixing of injected fuel with air on the basis of a flat-shaped spray.

DESCRIPTION OF THE PREFERRED EMBODIMENTS

Figure 7:
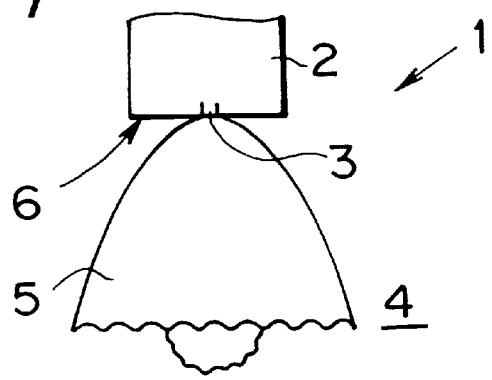
FIG. 7 is a simplified side view of the principal portion of the nozzle body 2 part of an ordinary electronic fuel injection valve 1.
Figure 8:
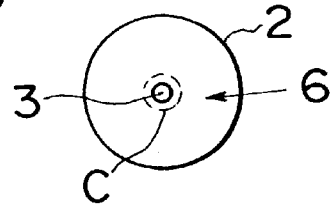
FIG. 8 is a bottom view, as seen from the combustion chamber 4 side, of the combustion chamber-side bottom surface 6 of a nozzle body 2 of an ordinary electronic fuel injection valve 1.

Next, an electromagnetic fuel injection valve 10 according to an embodiment of the present invention will be explained on the basis of FIG. 1 through FIG. 6. However, parts that are the same as those in FIG. 7 and FIG. 8 will be assigned the same reference numerals, and these parts will be omitted from the detailed explanation thereof.

Figure 1:
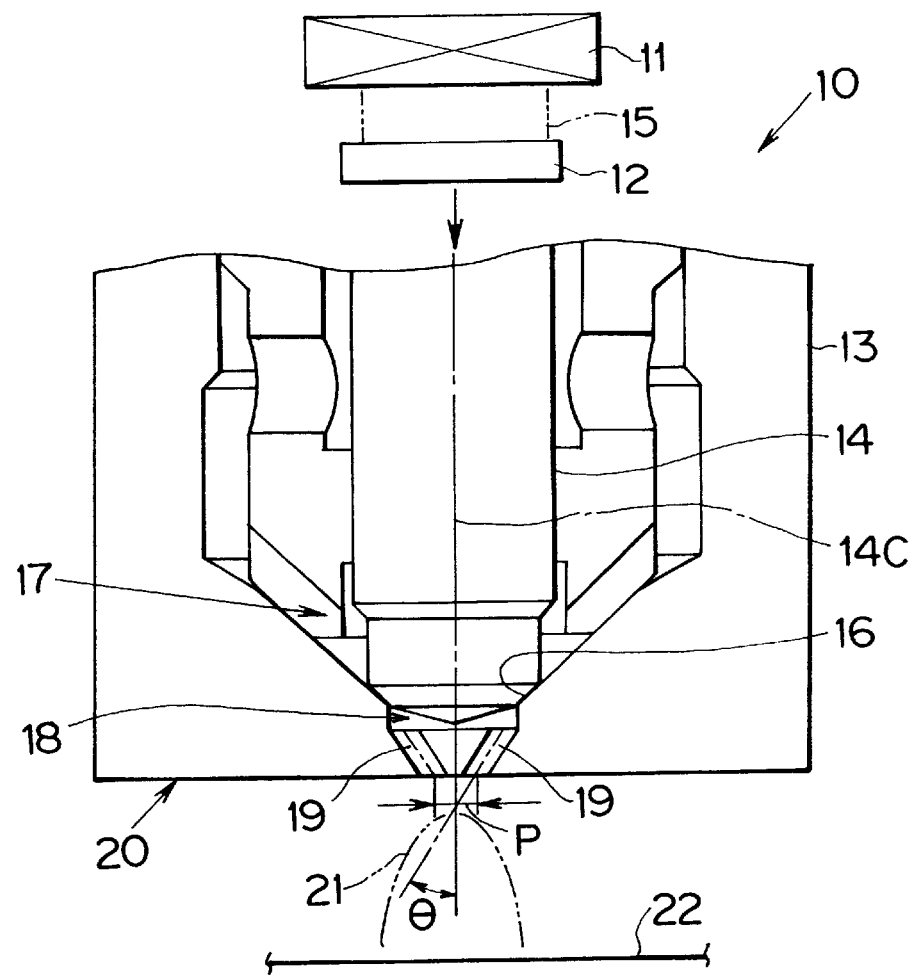
FIG. 1 is a longitudinal cross-sectional view of the principal portions of an electromagnetic fuel injection valve 10 according to an embodiment of the present invention.

FIG. 1 is a longitudinal cross-sectional view of the principal portions of an electromagnetic fuel injection valve 10, and the electromagnetic fuel injection valve 10 has an electromagnetic coil 11, and armature 12, a nozzle body 13, a needle valve 14, and a return spring 15.

In the nozzle body 13, there is formed the seat portion 16 of the needle valve 14, and there is formed a fuel reservoir chamber 17 on the upstream side thereof, and, in addition, there is formed an injection orifice upstream side space portion 18 on the downstream side thereof, and, linked to the injection orifice upstream side space portion 18 thereof, there is formed a pair of opposing injection orifices 19.

Figure 2:
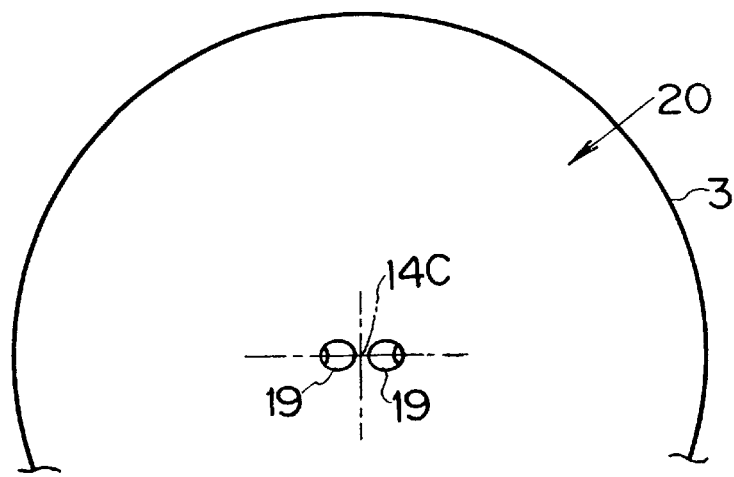
FIG. 2 is a partial bottom view, as seen from the combustion chamber 4 side, of the combustion chamber-facing surface 20 of a nozzle body 13 of an electromagnetic fuel injection valve 10 according to an embodiment of the present invention.

FIG. 2 is a partial bottom view, as seen from the combustion chamber 4 side, of the combustion chamber-facing surface 20 of the nozzle body 13, and the pair of injection orifices 19 are facing the combustion chamber 4 having a predetermined angle of inclination (an angle of inclination θ relative to the axis 14C of the needle valve 14) and relative spacing (pitch P).

In the electromagnetic fuel injection valve 10 thereof, the armature 12 is driven by the excitation of the electromagnetic coil 11 in opposition to the biasing force of the return spring 15, and the needle valve 14, which is driven integrally with the armature 12 thereof, is lifted from the seat portion 16, and high-pressure fuel is injected into the combustion chamber 4 via the injection orifices 19.

A flat-shaped spray 21 (fan spray) is formed by the respective jets of injected fuel, which are injected from the pair of injection orifices 19, impinging upon one another inside the combustion chamber 4.

More specifically, a pair of high-pressure jets from the pair of injection orifices 19 spread out from the impinging part thereof in a perpendicular direction in a plane comprising these jets. That is, a spray 21 spreads out uniformly in an overall oval shape or flat shape such that the front side of the impinging direction of the jets becomes wide, and the side sides become narrow, and atomization of the fuel is achieved by the impinging of the above-mentioned high-pressure jets, and, in addition, the mixing of the air and fuel inside the combustion chamber 4 is performed favorably.

Because the shape or configuration of the spray 21 thereof is narrow and wide, the adherence of fuel to the top surface of a piston 22 at compression time, when the piston 22 rises up inside the combustion chamber 4, can be held in check, enabling the prevention of worsening emissions.

Figure 3:
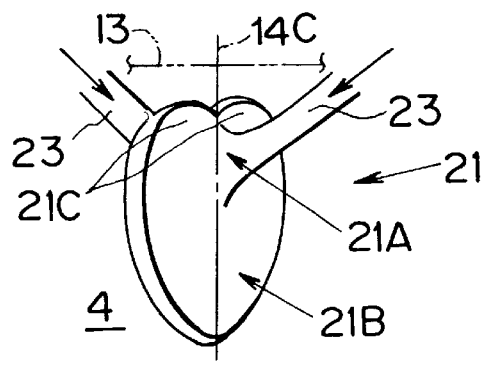
FIG. 3 is a simplified perspective view showing the shape of a spray 21 alone, without showing the nozzle body 13 and other parts of an electromagnetic fuel injection valve 10 according to an embodiment of the present invention.

FIG. 3 is a simplified perspective view showing the shape of the spray 21 alone, and omits the nozzle body 13 and so forth, and the spray 21 comprises a jet-impinging portion 21A of a pair of jets 23 from a left-right pair of injection orifices 19; a downstream side diffusing portion 21B in the direction of the combustion chamber 4; and an upstream side diffusing portion 21C in the direction of the combustion chamber-facing surface 20 of the nozzle body 13.

The jet-impinging portion 21A is directly below the axis 14C of the needle valve 14, and occupies a prescribed area (volume) in a part slightly separated from the combustion chamber-facing surface 20.

The downstream side diffusing portion 21B is a part, which is directly injected inside the combustion chamber 4 by the impinging of the pair of jets 23, and by promoting the atomization of the fuel and the mixing of the injected fuel with air in accordance with the flat-shaped spray 21 on the basis of impingement, it is possible to promote combustion, and to reduce emissions and fuel consumption.

The upstream side diffusing portion 21C is positioned to the upstream side from the jet-impinging portion 21A, and diffuses in the direction of the combustion chamber-facing surface 20 of the nozzle body 13, and, in addition, impinges at a prescribed pressure on the combustion chamber-facing surface 20 thereof from the downstream side toward the upstream side, cools the combustion chamber-facing surface 20 and injection orifices 19 parts thereof, and also washes off the part of the injection orifices 19. The upstream side diffusing portion 21C, after the cooling and washing action thereof, is injected into the combustion chamber 4 in a form, which merges with the downstream side diffusing portion 21B.

In order to generate an upstream side diffusing portion 21C, the viscosity and injection pressure of the fuel (gasoline), and also the angle of inclination θ and relative spacing (pitch P) of the pair of injection orifices 19 relative to the axis 14C of the needle valve 14, are adjusted.

For example, in general, the higher the viscosity and injection pressure, the easier it is to generate an upstream side diffusing portion 21C.

When the pitch P is fixed, the larger the angle of inclination θ, the easier it is for an upstream side diffusing portion 21C to move to the upstream side.

When the angle of inclination θ is fixed, the smaller the pitch P, the easier it is for an upstream side diffusing portion 21C to move to the upstream side.

Therefore, by selecting either the angle of inclination θ or the pitch P, and the various other conditions, it is possible to adjust the degree of diffusion of a spray 21 toward the upstream side.

Figure 4:
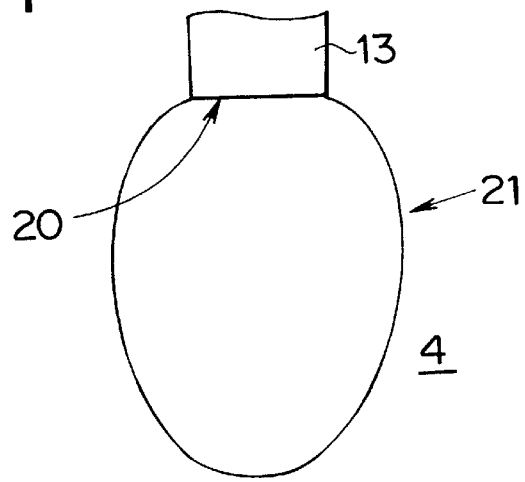
FIG. 4 is a side view of the wide angle side (side that spreads out wider) of a spray 21 of an actual spray from an injection orifice 19 of an electromagnetic fuel injection valve 10 according to an embodiment of the present invention.
Figure 5:
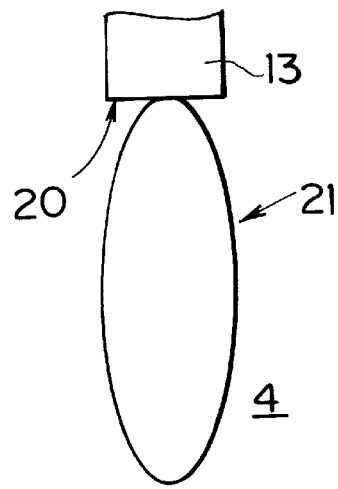
FIG. 5 is a side view of the narrow angle side (side that becomes thinner and flatter) of a spray 21 of an actual spray from an injection orifice 19 of an electromagnetic fuel injection valve 10 according to an embodiment of the present invention.

FIG. 4 is a side view of the wide angle side (side, which spreads out wider) of a spray 21 of an actual spray from the injection orifices 19, and FIG. 5 is a side view of the narrow angle side (side, which becomes thinner and flatter) of a spray 21 of an actual spray from the injection orifices 19, and the spray 21 of an isolated state shown in FIG. 3, in accordance with its mutual physical relationship to the nozzle body 13, actually spreads out to the total prescribed width of the combustion chamber-facing surface 20 of the nozzle body 13, and washes the surface 20 thereof off.

Figure 6:
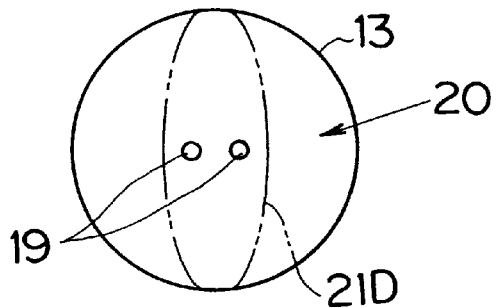
FIG. 6 is a bottom view, as seen from the combustion chamber 4 side, of the combustion chamber-facing surface 20 of a nozzle body 13 of an electromagnetic fuel injection valve 10 according to an embodiment of the present invention.

FIG. 6 is a bottom view, as seen from the combustion chamber 4 side, of the combustion chamber-facing surface 20 of the nozzle body 13, and the cooling and washing area 21D resulting from a spray 21 encloses a prescribed area, comprising the opening portions of the pair of injection orifices 19 on the combustion chamber-facing surface 20, and is constituted such that cooling and washing are performed inside the cooling and washing area 21D thereof.

In an electromagnetic fuel injection valve 10 of such a constitution, by lifting the needle valve 14, jets 23 of fuel from injection orifices 19 impinge upon one another in jet-impinging portion 21A, and, for example, diffuse in the left-right direction of FIG. 3, and, in addition, also diffuse in the up-down direction, and the upstream side diffusing portion 21C impinges at a prescribed pressure on the combustion chamber-facing surface 20 of the nozzle body 13, and in particular, on the cooling and washing area 21D, comprising therewithin the pair of injection orifices 19, and the portion thereof is cooled and washed, the temperature of the injection orifices 19 portion is lowered, and drops below the formation temperature of carbon deposits C, and, in addition, it is possible to remove from the combustion chamber-facing surface 20 (the cooling and washing area 21D) carbon deposits C, which could have formed slightly.

Therefore, by simply injected a fuel from injection orifices 19, it is possible for the injected fuel itself (spray 21) to perform cooling and washing of the combustion chamber-facing surface 20 of the nozzle body 13, eliminating the need for separately forming a cooling structure and so forth.

As explained hereinabove, according to the present invention, since the constitution is such that a spray created by the impinging of a left-right pair of jets is capable of diffusing not only in the direction of a combustion chamber of the downstream side, but also in the direction of the nozzle body of the upstream side, it is possible to improve the atomization of a fuel and the state of an air/fuel mixture, and to enhance the reliability and quality of an electromagnetic fuel injection valve, while suppressing the formation of carbon deposits by cooling a nozzle body.

What is claimed is:

1. An electromagnetic fuel injection valve for placement in a combustion chamber, the valve comprising:

a nozzle body having a side which faces into a combustion chamber, the nozzle body side having at least a pair of injection orifices exiting therefrom and the orifices being shaped to define respective jets of fuel exiting the orifices, the orifices being shaped and oriented so that the jets of fuel from the pair of orifices are aimed to impinge upon one another, wherein the pitch spacing of the orifices and the angle of each of the orifices for causing the impingement of the jets of fuel from the orifices are selected to be related to the pressure of the sprays through each of the orifices and to the viscosity of the fuel being injected through the orifices for forming a downstream side diffusing portion of the spray below a region of impingement of the sprays from the orifices upon each other and also for forming an upstream side diffusing portion of the spray which diffuses above the region of impingement of the sprays and toward the combustion chamber facing side of the nozzle body and at sufficient pressure on the side from the downstream side toward the upstream side thereof;

a valve in the nozzle body positioned at the orifices, the valve being operable for selectively opening and closing the injection orifices.

2. The electromagnetic fuel injection valve of claim 1, wherein the pitch of the orifices and the angles of the orifices are so related to the pressure of the spray and the viscosity of the fuel that the upstream side diffusing portion of the spray washes off the side of the nozzle body in the vicinity of the injection orifices.

3. The fuel injection valve of claim 1, wherein the valve is an electromagnetic valve including an electromagnetic coil in the nozzle body and operable on the valve for opening and closing the injection orifices by selectively exciting the coil.

4. The fuel injection valve of claim 1, wherein the pitch spacing and angles of the orifices are selected so that the upstream side diffusing portion of the spray forms a cooling and washing area on the side of the nozzle body, which area encloses a prescribed area comprising the injection orifices.

5. The fuel injection valve of claim 1, wherein the orifices are spaced and angled so that the sprays impinging upon one another define flat-shaped upstream and downstream side diffusing portions of the spray.

6. A method of delivering fuel through a fuel injection valve in a combustion chamber, wherein the valve comprises a nozzle body having a side which faces into a combustion chamber and the nozzle body side having at least a pair of injection orifices which define respective jets of fuel to be sprayed, the orifices being shaped and angled with respect to each other so that the jets of fuel through the orifices impinge upon one another, and the orifices have a pitch spacing between them;

the method comprising:
upon selection of the pitch spacing of the orifices and the angles of the orifices resulting in the angles of the sprays from the orifices impinging upon each other to define diffusing portions of the spray, the method comprising selecting the viscosity of the fuel and the pressure of the spray through each of the orifices in relationship to the pitch spacing of the orifices and the angles of the orifices for defining a flat-shaped spray where the jets of fuel impinge upon each other such that the flat-shaped spray forms a downstream side diffusing portion of the spray in the combustion chamber and also forms an upstream side diffusing portion of the spray that impinges on the nozzle body side.

7. The method of claim 6, further comprising impinging the spray on the side of the nozzle body sufficient to form a cooling and washing area on the nozzle body side in the vicinity of the injection orifices.

\* \* \* \* \*